United States Patent [19]
Ely et al.

[11] 3,912,626
[45] Oct. 14, 1975

[54] CATALYZED PROCESS AND CATALYST RECOVERY

[75] Inventors: Robert B. Ely, Wausau; Edmunds M. Pogainis, Mosinee; Clarence A. Hoffman, Rothschild, all of Wis.

[73] Assignee: Sterling Drug Inc., New York, N.Y.

[22] Filed: Mar. 18, 1974

[21] Appl. No.: 451,868

[52] U.S. Cl. ............................ 210/50; 210/63
[51] Int. Cl.² ................................ C02B 1/34
[58] Field of Search ............ 210/59, 60, 63, 45, 47, 210/50, 42; 252/411 S, 420, 416 S; 423/37

[56] References Cited
UNITED STATES PATENTS

| 1,832,217 | 11/1931 | Joseph | 252/411 S |
| 3,054,653 | 9/1962 | Barton et al. | 210/63 |
| 3,790,370 | 2/1974 | Lalancette | 210/42 |
| 3,804,756 | 4/1974 | Callahan et al. | 210/63 |
| 3,823,088 | 7/1974 | Box et al. | 210/63 |

Primary Examiner—Thomas G. Wyse
Assistant Examiner—Benoit Castel
Attorney, Agent, or Firm—Thomas L. Johnson; B. Woodrow Wyatt

[57] ABSTRACT

Wet air oxidation of sewage sludge or other wastewaters are catalyzed by copper or silver ions. The catalyst can be recovered by chemical precipitation processes, and recycled to the wet air oxidation system.

4 Claims, 1 Drawing Figure

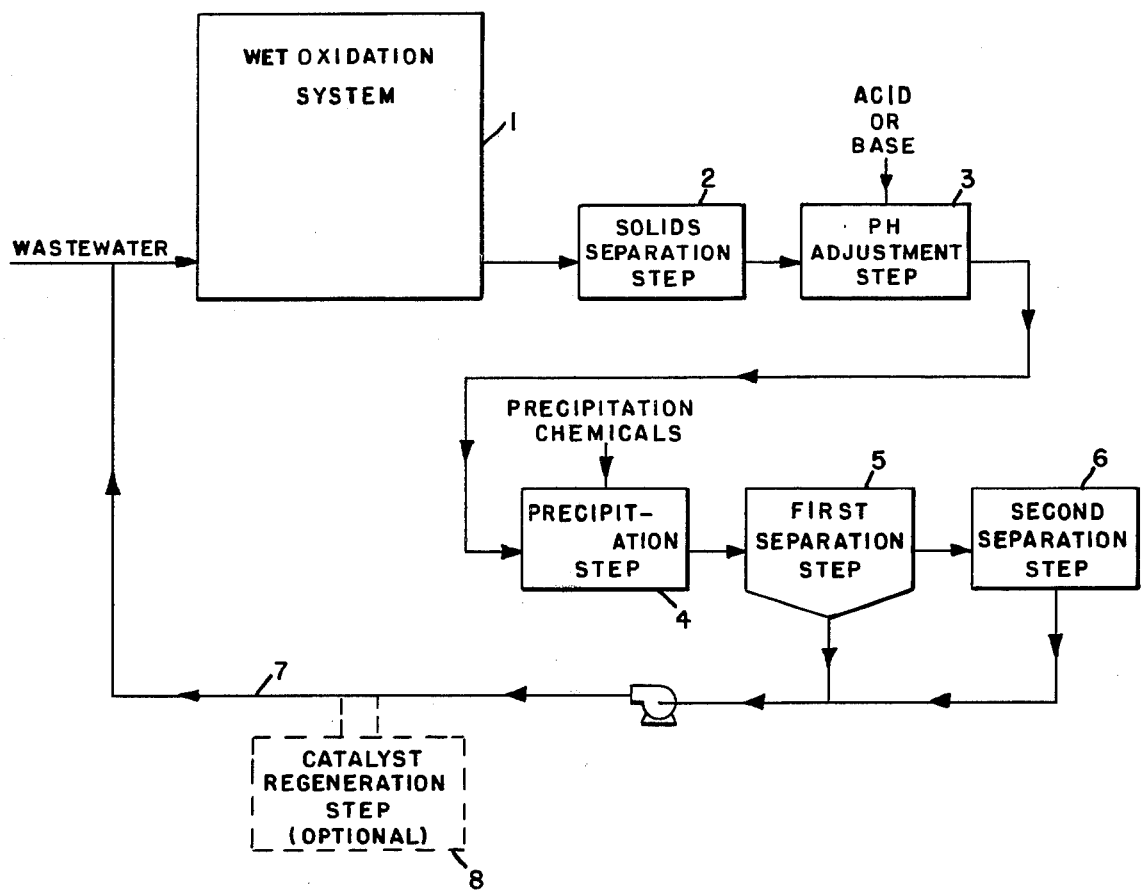

CATALYZED PROCESS AND CATALYST RECOVERY

This invention relates to catalysis of wet oxidation reactions as applied to treatment of sewage sludge or other waste-waters, and to the recovery and recycle of the catalysts employed. In particular, the inv ention is concerned with the promotion of wet oxidation of sewage sludge or waste-waters with a catalyst which is substantially soluble and homogeneous in the waste-waters under wet air oxidation reaction conditions, and the recovery of the catalyst as an insoluble precipitate which can be recycled to the wet oxidation reactor.

Wet oxidation is employed as a method of reducing the chemical oxygen demand of sewage sludge or other waste-waters. Efforts have been made to find catalysts which will promote the oxidation reaction, reduce the oxidation time and/or temperature and increase the completeness of oxidation, thereby improving the economics of the process. However, waste-waters contain components which readily deactivate catalysts, especially the more common heterogeneous catalysts. For example, platinized alumina will promote the wet oxidation of many pure organic solutions; however, experiments have shown that actual industrial wastes or biological sludges of a municipal origin usually deactivate the catalyst after a brief use.

Catalysts which are substantially soluble and homogeneous in the aqueous waste are less susceptible to poisoning or deactivation. It has now been found that copper (cupric) and silver ions are especially effective catalysts when present in a concentration of between 10 and 10,000 milligrams per liter, preferably between 50 and 1000 milligrams per liter. The use of such catalysts will typically increase the reduction in chemical oxygen demand from values of 40 % to 80 % to corresponding values of 80-100 % at given conditions of temperature and pressure. Cupric ion is the preferred ion.

The catalyst is added to the waste-water prior to wet oxidation in the form of a substantially water soluble cupric or silver salt, such as cupric sulfate, cupric nitrate, silver nitrate, silver acetate, silver sulfate or the like. Alternatively, a water insoluble form, e.g. copper sulfide or silver sulfide, which is oxidized to water soluble form under wet air oxidation conditions can be added.

The wet oxidation is carried out at a temperature between about 150° and 340°C. and a pressure between about 200 and 4000 psi.

In order that the maximum economic value may be realized from the process, and for environmental reasons, it is highly desirable that the catalyst be recovered from the oxidized mixture and regenerated and recycled to the oxidation reactor for oxidation of additional waste-water. Metal ions such as copper and silver are toxic and require virtually complete removal before the treated waste-water can be discharged into the environment.

The catalyst is recovered from the oxidized waste water as follows: suspended solids are removed physically from the oxidized waste-water e.g. by settling and decanting, filtration or centrifugation. The resulting liquor is then treated with a chemical which reacts with the solubilized catalyst to form an insoluble precipitate. If necessary, acid or base is added to the liquor, either before or during the addition of the chemical, to adjust the pH to the range where optimum precipitation occurs. The precipitated form of the catalyst is separated from the liquor by settling, dissolved air flotation, centrifugation, filtration or other liquid-solid separation operations. The solid catalyst sludge is then returned to the wet oxidation reactor for in situ regeneration of the solubilized catalyst, or is regenerated in a separate regeneration step prior to reintroduction into the wet oxidation reactor.

A preferred chemical for precipitation of the water-soluble catalyst is a source of sulfide ions, for example, sodium sulfide or hydrogen sulfide. This forms a precipitate of copper and/or silver sulfide at a pH range of 3-12.

Referring to the accompanying drawing, the catalyst recovery and recycle system is practiced as follows: waste-water which has been treated by means of a catalytically assisted wet oxidation system 1 has the non-catalytic suspended solids physically separated in step 2, the pH is adjusted with acid or base in step 3, if required, so that the pH of the stream is such that the most effective precipitation and removal of the catalyst is achieved in subsequent steps. Precipitation is caused in the next step 4 by the addition of a chemical which forms an insoluble precipitate with the catalyst. The precipitated catalyst is then substantially separated from the waste-water in step 5. This may be accomplished by settling, dissolved air flotation, centrifugation, filtration or other liquid-solid separation operations. A second separation step 6 may be employed to remove nearly all traces of the catalyst. Catalyst sludge from the separation steps is then returned via line 7 directly to the wet oxidation system for in situ regeneration or is processed through a separate catalyst regeneration step 8.

It is obvious to one skilled in the art, that the processing steps can be rearranged, added to or deleted in certain situations. For example, pH adjustment may conveniently be accomplished before the wet air oxidation step. Finer control over precipitation may be obtained by pH adjustment both before and after chemical addition and precipitation. Further, the addition of a holding tank between the first separation step and second separation step may be beneficial insofar as it permits further precipitation and/or flocculation of precipitate particles. Further, the processing steps can be carried out in either a batch or continuous mode.

The following examples will further illustrate the invention without the latter being limited thereby.

EXAMPLE I

An acrylonitrile waste having a chemical oxygen demand (COD) of 38.9 grams per liter, a total solids content of 47.5 grams per liter, a sulfur content of 3.8 grams per liter, an ammonia nitrogen content of 8.1 grams per liter and a cyanide content of 0.60 grams per liter, was oxidized in separate runs at 230°, 260° and 300°C. for 1 hour in a shaking titanium vessel. COD reductions of 46.0, 64.5 and 82.3 %, respectively, were obtained in the three runs. In three further runs under identical conditions except that 400 milligrams per liter of copper as copper sulfate was added, COD reductions of 89.7, 95.9 and 97.8 %, respectively, were obtained.

EXAMPLE II

An industrial waste-water with the indicated composition below is wet oxidized batchwise at 320°C. for 60 minutes in an electrically heated bomb type stainless steel shaking autoclave. Run 1 is carried out without catalyst so that an effluent COD level is established to which to compare the degree of oxidation with runs carried out with fresh catalyst and recycled catalyst. Run 2 employs fresh copper sulfate as catalyst. The oxidized liquor had a satisfactory pH of above 4.0. A slight excess of $H_2S$ was bubbled through at 212°F. with sufficient agitation to insure complete mixing. The resulting CuS precipitate is allowed to settle for one hour and the copper content of the decant measured. The decant is filtered through a Whatman No. 1 filter paper. The precipitated catalyst sludge is returned to the autoclave and is reoxidized with fresh waste-water. The pH adjustment, precipitation, settling and filtration steps are repeated in Runs 3 through 7.

SYNTHESIZED INDUSTRIAL WASTE
COMPOSITION AND CHARACTERISTICS

| Acetone | 1.10% |
|---|---|
| Isopropanol | .13% |
| Isopropyl Acetate | .05% |
| Acetic Acid | 1.30% |
| Acrylic Acid | .84% |
| Formaldehyde | .68% |
| Dichromate chemical oxygen demand | 36.0 g/l |

| | Run 1 | Run 2 | Run 3 | Run 4 | Run 5 | Run 6 | Run 7 |
|---|---|---|---|---|---|---|---|
| COD Raw Waste g/l | 36.0 | 36.0 | 36.0 | 36.0 | 36.0 | 36.0 | 36.0 |
| COD Oxid. Waste g/l | 14.9 | 1.7 | 3.1 | 3.2 | 3.0 | 3.0 | 2.3 |
| % COD Reduction | 58.6 | 95.2 | 91.3 | 91.0 | 91.6 | 91.6 | 93.5 |
| PPM Cu in Effluent | 0 | 400 | 400* | 400* | 400* | 400* | 400* |

*Less minor handling losses

We claim:

1. The improvement in the process of wet oxidation of waste-waters which comprises carrying out said oxidation in a reactor at a temperature between about 150° and 340°C. and a pressure between about 200 and 4000 psi in the presence of cupric ion or silver ion in a concentration of between 10 and 10,000 milligrams per liter, subjecting the resulting oxidized waste-water to liquid-solid separation to remove non-catalytic suspended solids, treating the liquid phase with a source of sulfide ions which reacts with the cupric or silver ion to form an insoluble precipitate containing cupric or silver sulfide, separating the precipitate from the liquid phase, and reintroducing the precipitate into the wet oxidation reactor thereby regenerating cupric or silver ions for catalysis of the oxidation of additional waste-water.

2. The process according to claim 1 in which cupric ion is present.

3. The process according to claim 1 in which said liquid phase is treated with acid or base to adjust the pH to an optimum value for precipitation of the copper or silver.

4. The process according to claim 1 in which said precipitate is oxidized to a soluble form in situ in the wet oxidation reactor.

* * * * *